Oct. 30, 1951  C. W. SCHUMACHER  2,572,955
VENTILATOR
Filed March 22, 1950
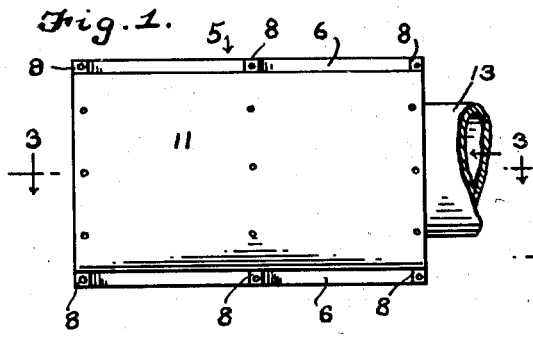
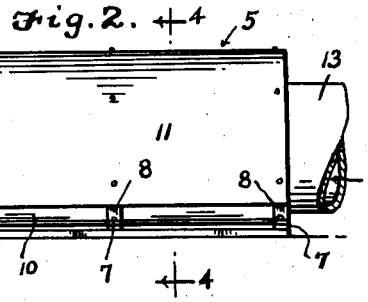
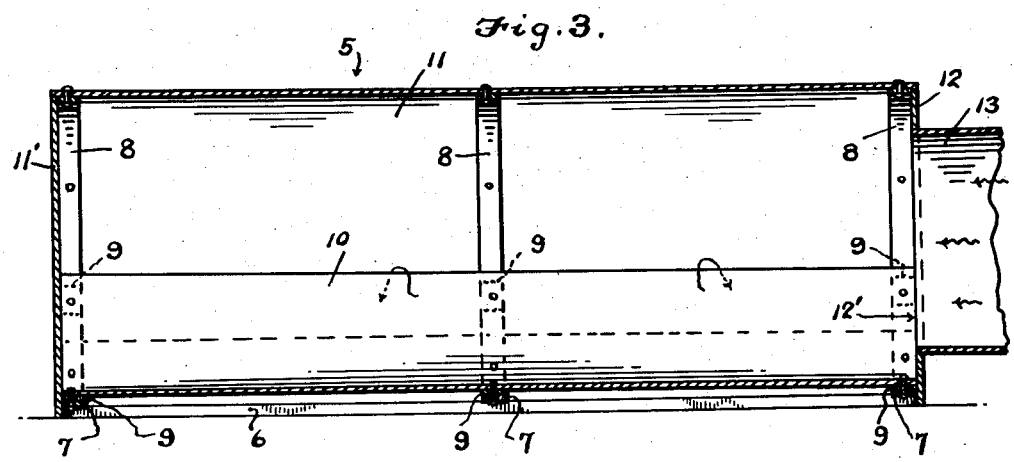
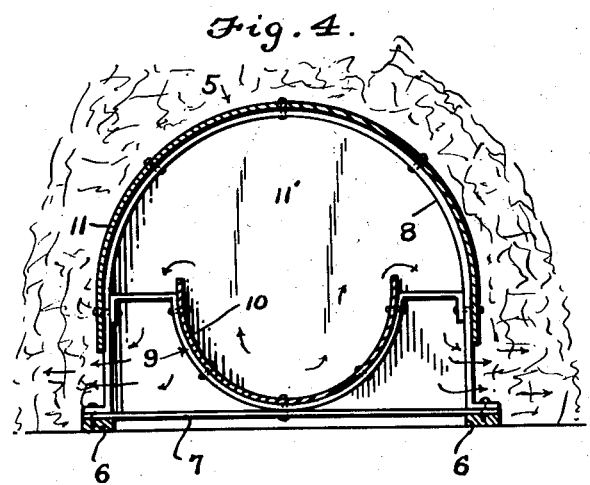
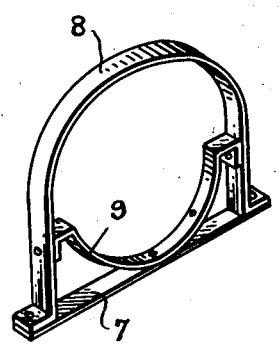
INVENTOR
Clifford W. Schumacher
BY L. B. James
ATTORNEY Patented Oct. 30, 1951

2,572,955

UNITED STATES PATENT OFFICE 2,572,955

VENTILATOR

Clifford W. Schumacher, Newcomerstown, Ohio

Application March 22, 1950, Serial No. 151,207

2 Claims. (Cl. 98—56)

This invention relates to the official class of drying and ventilating and more particularly a new and useful ventilator for stored grain, hay and the like.

One of the objects of this invention resides in the provision of a ventilator for stored grain, hay and the like which will not become clogged by the material surrounding the same.

Another object of this invention resides in the particular construction of the ventilator.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Fig. 1 is a plan view of the ventilator.

Fig. 2 is a side view thereof.

Fig. 3 is an enlarged longitudinal sectional view taken approximately on line 3—3 of Fig. 1.

Fig. 4 is a cross sectional view taken approximately on line 4—4 of Fig. 2.

Fig. 5 is a perspective view of one of the brackets.

In the present illustration of this invention the numeral 5 designates, in general, a ventilator adapted to be disposed beneath stored grain, hay or the like and consists of elongated base members 6 disposed in spaced parallel relation by cross members 7 and supporting longitudinally spaced brackets 8 preferably of inverted U-shaped configuration which, in turn, support a like member of substantially U-shaped brackets 9 of lesser diameter thereto.

Secured in the aforesaid U-shaped bracket and extending throughout the length of the ventilator is an elongated substantially U-shaped air deflector 10 over which an inverted U-shaped hood 11 is supported by the brackets 8 in spaced relation thereto with its lower edges disposed on a horizontal plane below that horizontal plane occupied by the air deflector 10 so as to prevent the material surrounding the ventilator from flowing upwardly into the air deflector 10.

Disposed over the rear ends of said air deflector and hood and secured to the rear inverted U-shaped bracket is an end piece 11' while likewise secured over the front ends of the air deflector and hood is an end piece 12 having a centrally disposed air inlet hole 12' therein which communicates with an air inlet duct 13 leading from the ventilator beneath the stored grain hay or the like to a source of fresh or heated air as the occasion may demand, it being understood that although the ventilator is herein set forth as supplying fresh or heated air to the material thereabout, it also performs the function of preventing accumulation of spontaneous combustion gaseous air in the stored material.

With this invention fully set forth, it is manifest that a ventilator is provided which readily performs the functions of its adoption and, through the simplicity of construction thereof, it can be cheaply manufactured and sold at a reasonable price.

Having thus described my invention, what I claim and desire to protect by Letters Patent is:

1. A ventilator for stored grain and hay comprising, a pair of elongated base members disposed in spaced parallelism, cross pieces connecting the base members, substantially inverted U-shaped brackets having their ends connected to the base members, substantially U-shaped brackets of lesser diameter supported by the inverted U-shaped brackets with their lower looped portions disposed above said cross pieces, an elongated inverted U-shaped air deflector seated in and secured to the U-shaped brackets, a substantially inverted U-shaped hood secured to the first mentioned brackets and lying in spaced relation to the inverted U-shaped air deflector with its opposite side edges lying on a horizontal plane below that horizontal plane occupied by the upper side edges of the air deflector and above that plane occupied by the base members, a rear end piece secured over the rear ends of said hood and air deflector, a front end piece having a centrally disposed hole therein secured over the front ends of the hood and air deflector, and an air duct communicating with the hole in the front end piece and extending outwardly therefrom.

2. A ventilator for stored grain and hay comprising an elongated inverted U-shaped air deflector, a hood of greater diameter spacedly disposed over the air deflector with its lower side edges lying on a horizontal plane below that horizontal plane occupied by the upper side edges of the air deflector, a rear end piece secured over the rear ends of the air deflector and hood, a front end piece secured over the front ends of the air deflector and hood and having an enlarged hole therein communicating with the space between the air deflector and hood, an air duct communicating with the hole in front end piece, and means connecting the air deflector and hood in opposed spaced relation to one another with the side edges of the latter disposed below the side edges of the former and above their supporting surface.

CLIFFORD W. SCHUMACHER.

REFERENCES CITED

The following references are of record in the file of this patent:

UNITED STATES PATENTS

| Number | Name | Date |
|---|---|---|
| 1,214,033 | Hercer | Jan. 30, 1917 |
| 1,541,918 | Brennan | June 16, 1925 |
| 2,196,391 | Gronert | Apr. 9, 1940 |